United States Patent [19]

Burnham

[11] 4,244,470

[45] Jan. 13, 1981

[54] INDIVIDUAL ICE CREAM DISPENSING RECEPTACLE

[75] Inventor: John M. Burnham, Hingham, Mass.

[73] Assignee: Howard Johnson Company, Boston, Mass.

[21] Appl. No.: 64,061

[22] Filed: Aug. 6, 1979

[51] Int. Cl.³ .................. B65D 83/00; B65D 85/78
[52] U.S. Cl. .................................. 206/525; 150/0.5; 220/4 B; 229/2.5 R
[58] Field of Search ............ 206/525; 229/2.5; 220/4 B, 4 E; 150/0.5

[56] References Cited

U.S. PATENT DOCUMENTS

| | | | |
|---|---|---|---|
| 3,149,188 | 9/1964 | Schmitt | 206/525 |
| 3,483,908 | 12/1969 | Donovan | 150/0.5 |
| 3,511,433 | 5/1970 | Andrews et al. | 229/2.5 R |
| 3,834,437 | 9/1974 | Swett et al. | 150/0.5 |
| 3,861,433 | 1/1975 | Schier et al. | 150/0.5 |

*Primary Examiner*—William T. Dixson, Jr.
*Attorney, Agent, or Firm*—Robert T. Gammons

[57] ABSTRACT

A receptacle for holding refrigerated units of ice cream for individual servings comprising two hingedly connected parts which in conjunction when disposed face-to-face define an enclosure of a predetermined shape for receiving and molding ice cream and when separated permit removal of the ice cream in the form of the enclosure and wherein one of the parts contains a filling opening and wherein the parts are comprised of thin wall flexibly displaceable plastic such that when the parts are separated the ice cream may be ejected by pressing the part containing the ice cream.

3 Claims, 5 Drawing Figures

INDIVIDUAL ICE CREAM DISPENSING RECEPTACLE

BACKGROUND OF THE INVENTION

The receptacle of this invention is designed especially to enable serving individual portions of ice cream without having to remove the ice cream from a bulk lot or having to scoop or spoon it out of a paper or plastic cup and is especially designed for the catering services on airlines to enable the hostess to quickly and easily deposit an individual serving of ice cream on a dish or in a glass without having to touch the ice cream or use any implements to remove it from the receptacle.

SUMMARY OF THE INVENTION

As herein illustrated, the invention resides in a receptacle comprising two hingedly connected parts which in conjunction when disposed face-to-face define an enclosure of predetermined shape for holding a molding of hardenable substance and when separated permit removal of the hardened substance in the form of the enclosure from one of the parts. The enclosure is comprised of a thin wall yieldably flexible plastic such as to enable displacing a portion of the wall inwardly of the part containing the frozen substance when the parts have been separated from each other to enable ejecting the hardenable substance therefrom. One of the parts contains a filling opening. There are releasably interengageable means at the facing sides for holding the parts together and flange members at the open sides which collectively provide a support for the receptacle for storage during refrigeration in a holder containing holes corresponding in diameter to the diameter of the receptacle.

The invention will now be described in greater detail with reference to the accompanying drawings, wherein.

Figure 1:
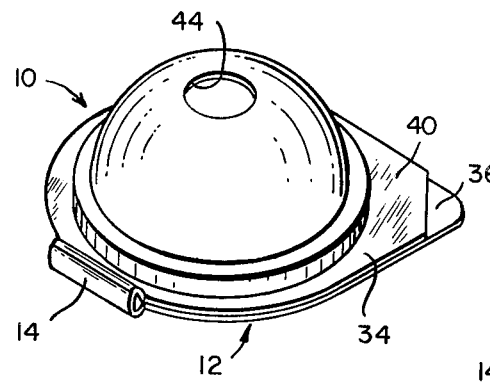
FIG. 1 is a perspective view of the receptacle as seen from the top side showing the filling opening.
Figure 2:
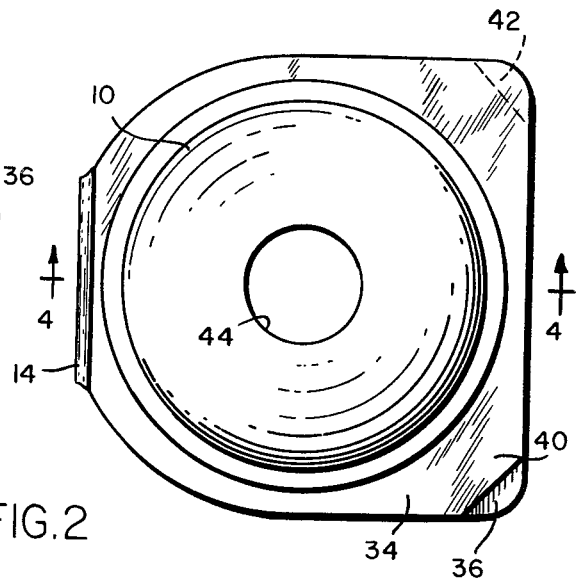
FIG. 2 is a plan view of the receptacle shown in FIG. 1 to larger scale.
Figure 3:
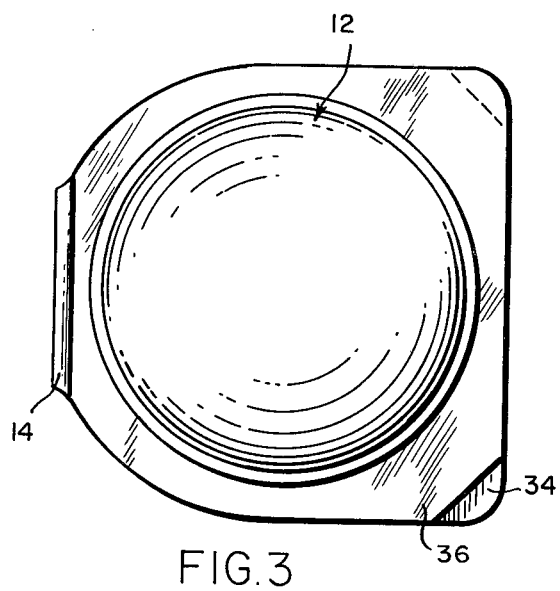
FIG. 3 is a bottom view of the receptacle shown in FIG. 2.
Figure 4:
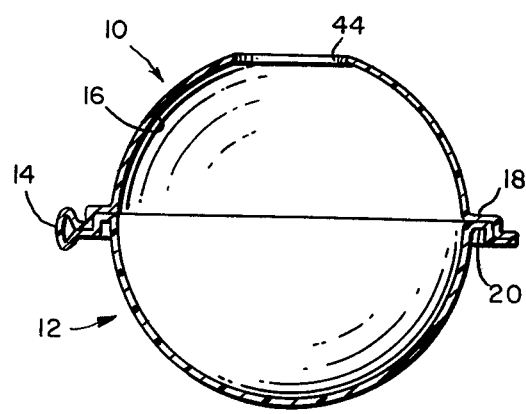
FIG. 4 is a vertically diametral section taken on the line 4—4 of FIG. 2.

As herein illustrated, FIGS. 1 to 4, the receptacle for the storage of individual servings of ice cream comprises two parts 10 and 12 connected by hinge means 14 which collectively define a substantially spherical chamber 16, FIG. 4.

The parts 10 and 12 are held together in face-to-face relation by interengageable means comprising a circular groove 18 at the open side of the part 10 and a circular rib 20 at the open side of the part 12, the groove and rib being dimensioned so that the rib fits snugly into the groove so as to hold the parts together, but permitting the parts to be disengaged to separate the parts from each other. The groove 18 is formed by a radial extension 22 from the wall 24 of the part 10 and a flange 26 at its peripheral edge. The rib 20 is formed by a radial extension 28 from its side wall 30 of the part 12 and a flange 32 at its periheral edge. Peripherally of the flange 26 there is a planar flange 34 parallel to the radial extension 22 and peripherally of the flange 32 there is a planar flange 36 parallel to the radial extension 28. When the two halves 10 and 12 are engaged face-to-face, rib 28 is seated in groove 26 and the two planar flanges 34 and 36 have face-to-face contact. The planar flanges 34 and 36 as shown in the Figures provide means for hingedly connecting the parts by means of the hinge member 14. In addition, they provide means for engaging and disengaging the two halves with each other and to facilitate this operation one corner of the planar flange 34 is aborted at 40, FIG. 1, to expose the planar flange 36 therebelow and the other corner of the planar flange 36 is aborted at 42 to expose the planar flange 34 thereabove. The planar flanges 34 and 36 additionally provide support for the receptacle when placed within a hole of corresponding diameter in a holder or rack for refrigeration and storage.

The part 10 contains an opening 44 which is concentric with the side of the part.

Figure 5:
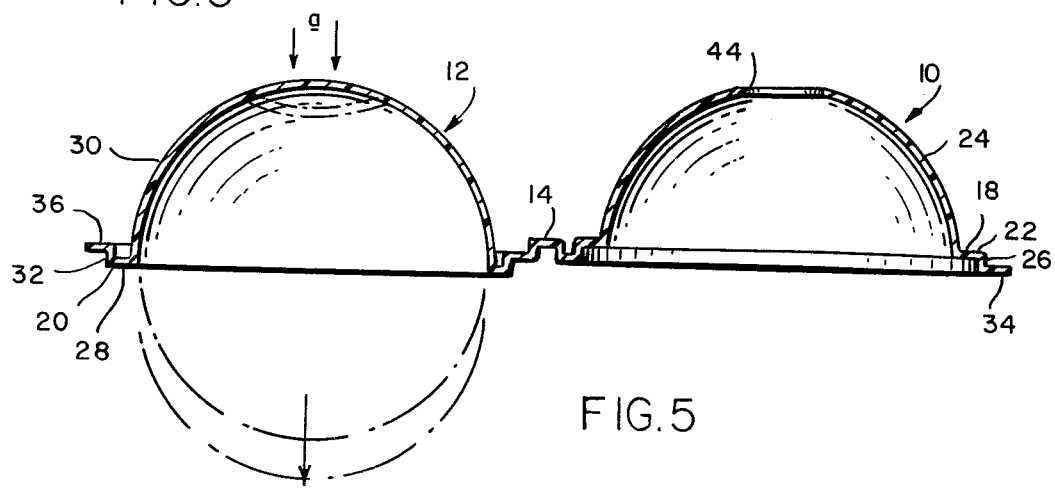
FIG. 5 is a section of the receptacle showing the two halves opened to enable ejecting the frozen material from one of the halves.

The receptacle is designed specifically for ice cream which is injected into it when it is relatively soft to completely fill it, whereupon the filled receptacle is placed in a refrigerated area at a temperature low enough to completely freeze the ice cream. When it is ready to be served as an individual helping the server disengages the interlocking rib and groove so as to separate the two halves 10 and 12 from each other as shown in FIG. 5, holding the parts upside down, whereupn pressure is applied in the direction of the arrows a shown in FIG. 5 to displace the wall 30 downwardly and thus to eject the frozen ball of ice cream into a dish or into a glass.

The receptacle is comprised of a thin wall plastic, for example, polyethylene molded to the shape herein illustrated. However, it is to be understood that it could have a different configuration so long as the halves are symmetrical so that the frozen product can be easily discharged. If found desirable, the plastic of which the receptacle is made may be tinted or colored to represent the flavor of the ice cream packaged therein to facilitate selection when serving and the wall of one or both halves may be embossed to identify the product being served and/or manufacturer.

The size of the receptacle can, of course, be made larger or smaller, depending upon the quantity of the serving and while the device is designed especially for storage of individual servings of ice cream, it can be used for the molding and serving of individual servings of other hardenable substances.

It should be understood that the present disclosure is for the purpose of illustration only and includes all modifications of improvements which fall within the scope of the appended claims.

What is claimed is:

1. A receptacle for molding and dispensing ice cream comprising in combination a dished top part of predetermined configuration, a dished bottom part of corresponding configuration, said top and bottom parts having abutting edges and at said edges mutually interengaged structures which hold the top and bottom parts together so as to define a structure containing an interior cavity for receiving ice cream and said top part containing an opening located symmetrically with respect to its axis of symmetry through which the ice cream in fluid form is introduced into the cavity to fill same to therefor form the material to the interior configuration of the cavity, said parts being comprised of thin, flexibly yieldable plastic material such as to be easily displaced inwardly by application of finger pressure to the outside, said mutually-engageable structures comprising at the edge of each part an outwardly-extending flange defining an annular planar surface and a downwardly-extending flange defining a cylindrical surface, said annular flange and circular flange at the edge of the top part defining a downwardly-facing groove, and said annular flange and cylindrical flange at the edge of the bottom part defining an upstanding rib which is frictionally received within the groove, and a support flange extending outwardly from the lower edge of each of the cylindrical flanges, a hinge connecting the support flanges, said hinge comprising a tubular fold embodying oppositely-diverging leaves joined at their distal edges by a flexible arcuate back part which permits the support flanges to meet in a common plane, said support flanges embodying planar portions extending from the ends of the hinge forwardly therefrom along the opposite sides of the structure and along the front side thereof, and forming in conjunction a support for supporting the structure in a horizontal plane within a support containing an opening corresponding in configuration to the horizontal section of the parts at their meeting edges, said support flanges at the junction of the side portion with the front portion defining corners and wherein a corner of one flange and the opposite corner of the other flange are cut off at an angle to expose the subjacent and superencumbent corners of the respective flanges.

2. A receptacle according to claim 1 wherein the two parts are hemispherical.

3. A receptacle according to claim 2 wherein the two hemispherical parts are integrally joined by said hinge.

* * * * *